United States Patent
Paul et al.

[11] Patent Number: 5,857,336
[45] Date of Patent: Jan. 12, 1999

[54] THERMO-ELECTRIC POWER PLANT WITH ASYMMETRIC EXHAUST SYSTEM

[76] Inventors: Marius A. Paul; Ana Paul, both of 1120 E. Elm Ave., Fullerton, Calif. 92631

[21] Appl. No.: 642,390

[22] Filed: May 3, 1996

[51] Int. Cl.$^6$ .............................. F02B 37/00; F02B 41/10
[52] U.S. Cl. ................................................................ 60/597
[58] Field of Search .......................... 60/597, 598, 605.1, 60/607, 608, 612

[56] References Cited

U.S. PATENT DOCUMENTS 4,756,377  7/1988  Kawamura et al. ...................... 60/597

FOREIGN PATENT DOCUMENTS 60-135616  7/1985  Japan ........................................ 60/597
63-9616   1/1988  Japan ........................................ 60/597

*Primary Examiner*—Michael Koczo
*Attorney, Agent, or Firm*—Bielen, Peterson & Lampe

[57] ABSTRACT

A power plant system particularly useful for hybrid vehicles driven by electric motors, the power plant system including a positive displacement engine with a bifurcated exhaust forming first and second exhaust passages for expansion gases, each passage being separately controlled by an independently operated engine exhaust valve, the first exhaust passage supplying expansion gases to a turbine connected to a compressor delivering compressed air to the engine and the second exhaust passage supplying expansion gases to a turbine connected to an electric generator, the power plant system having a system control module independently controlling each exhaust valve for optimum air compression for the load and speed of engine operation.

10 Claims, 3 Drawing Sheets

THERMO-ELECTRIC POWER PLANT WITH ASYMMETRIC EXHAUST SYSTEM

BACKGROUND OF THE INVENTION

This invention relates to an optimized power plant for vehicle propulsion or stationary power production. In particular, the power plant relates to an energy optimization and recovery system for a high pressure thermal engine operating under attenuated load conditions for maximizing fuel efficiency.

Modern reciprocal engines operate at high pressure to maximize the efficiency of converting thermal energy to mechanical work. Unfortunately, conventional high pressure engines are characterized by a pronounced "hook shape" in the graph of specific fuel consumption under changing load conditions. At loads higher or lower than the "optimum point," fuel efficiency rapidly degenerates. The ordinary driving conditions for a family vehicle provide a wide range of operating loads, and the vehicle engine is rarely operating at optimum efficiency.

To gain the advantage of high engine efficiency and yet accommodate varying load conditions of ordinary driving, modern power plant designers for vehicles are turning to hybrid propulsion systems. By coordinating engine operation with power from a stored energy reserve, load demands are attenuated allowing engine operation within a narrower optimum range.

Certain solutions for boosting the efficiency of a thermal engine in a hybrid propulsion system have been proposed, and reference is herein made to our copending applications, Ser. No. 08/563,923, filed 29 Nov. 1995, entitled ADVANCED THERMOELECTRIC SYSTEMS FOR HYBRID ELECTRIC VEHICLES.

Typically, to achieve high operating pressures, engines are supercharged by a turbocharger which is a turbine driven compressor that delivers air to the engine at an optimal pressure for the engine load. However, typical turbine driven compressors also have a narrow range of efficient operation, and under higher engine loads, a waste gate is employed to prevent over-compression. A waste gate allows a portion of expanding exhaust gases from the engine to by-pass the turbocharger and be vented without generating useful work. Frequently, long-haul trucks and passenger vehicles spend a high percentage of travel time on freeways, where valuable thermal energy during this high load, high rotation operation would be lost, drastically reducing the overall fuel efficiency of a turbocharged engine.

A stored energy reserve may comprise a flywheel, a high-density capacitor or more conventionally a plurality of batteries forming a battery bank. Because of the cost and inherent weight of a battery bank, or a combination-type energy reserve, it is desirable that the capacity and hence the size and weight be minimized. Therefore, to achieve the advantages of a hybrid propulsion system, where electrical drive motors supplement or are supplied electricity by the power output of the thermal engine, the stored energy reserve is reduced in capacity by the supplemental electrical energy recoverable in the novel power plant of this invention. The stored energy reserve, for example, can be sized to accommodate storage of recovered energy from brake regeneration systems that transform deceleration of the vehicle into electrical power.

Since the direct recovery of thermal energy and its transformation into electrical energy in the invented system occurs under high demand and output conditions, the converted energy is immediately placed in service to supplement the power output of the thermal engine. There is little or no requirement that the storage capacity of the energy reserve be expanded to accommodate any carryover, except to replenish a depleted reserve.

Similarly, in stationary power generating plants, the recovery of the thermal energy ordinarily lost in a waste gate is immediately recovered as supplementary power, thereby reducing the size of the thermal engine required for a particular service.

In each case, the compressor delivering air to the thermal engine operates at optimum efficiency and is driven by the required expansion gas stream to maintain optimization. Excess combustion gases are separated at the engine for passage through an auxiliary turbine that drives an electrical generator for the capture of otherwise lost thermal energy, as electrical energy.

SUMMARY OF THE INVENTION

The optimized power plant of this invention relates to a high pressure thermal engine and in particular, a reciprocal engine with a turbocharger system including a turbine driven compressor operated at peak efficiency during the full range of engine operation, and, a turbine driven generator, wherein thermal energy discharged from the engine in the exhaust stream that is not utilized for air compression is recovered by the turbine driven generator and is converted to electrical energy.

To accomplish this optimization in real time during the engine cycle, the exhaust of the thermal engine is bifurcated and regulated by the engine exhaust valve system. In a four valve system for four-cycle engines or in a two valve exhaust system for two-cycle engines, each exhaust valve is independently controlled to allocate the optimum quantity of exhaust gases to the turbine driven compressor and the remaining gases, if any, to the drive turbine of the turbine driven generator. In this manner, the turbine driven compressor is operated optimally at all loads and rotations of the engine, and excess expansion gases are shunted, not to a waste gate, but through the turbine driving the generator.

With control of the expansion process located at the engine exhaust valves for each cylinder, cycle by cycle adjustment is enabled with a constant air supercharging pressure being produced for lean combustion at all loads and rotations.

The optimized power plant of the preferred embodiments is in the form of a modification to existing quad valve engines for four-cycle engines or dual exhaust valve systems for two-cycle engines of spark ignited or autoignition diesel-type engines. In one preferred embodiment, the optimized power plant utilizes the super high pressure, opposed piston engine of earlier designs as disclosed in U.S. Pat. No. 5,058,537 for OPTIMIZED HIGH PRESSURE INTERNAL COMBUSTION ENGINES, issued Oct. 22, 1991.

These and other features will become apparent from a consideration of the embodiments disclosed in the Detailed Description of the Preferred Embodiments that follows.

DETAILED DESCRIPTION OF THE PREFERRED EMBODIMENTS

Figure 1:
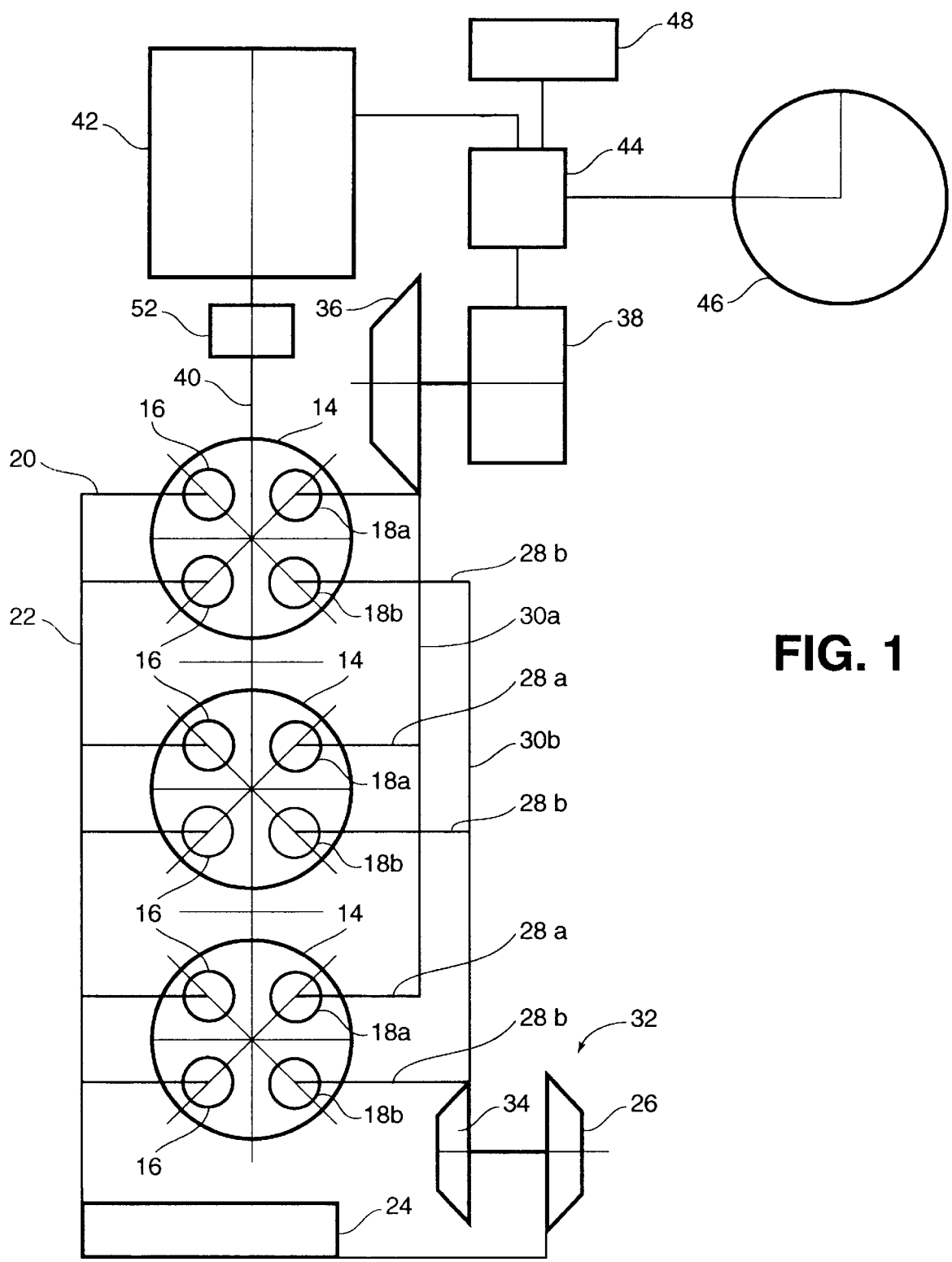
FIG. 1 is a schematic top view of a power plant system for hybrid propulsion with a three cylinder, quad valve engine.

In a first embodiment, the optimized power plant is schematically shown in FIG. 1 and designated generally by the reference numeral 10. In FIG. 1, a typical quad-valve engine 12 is shown with three cylinders 14. Each cylinder 14 has two intake valves 16 and two exhaust valves 18a and 18b. Each of the intake valves 16 has an intake passage 20 that connect the intake valves of the cylinders 14 to an intake manifold 22 which is connected to an intercooler 24 and to a rotary compressor 26.

Each of the two exhaust valves, 18a and 18b for each cylinder 14 has a separate exhaust passage 28a and 28b, that connect to separated common passages or manifolds 30a and 30b of a compound turbocharging system 32.

The turbocharging system 32 includes a turbine 34 connected to and driving the rotary compressor 26 and a turbine 36 connected to and driving an electric generator 38. In each cylinder 14, one exhaust valve is dedicated to providing expansion gases to the supply manifold 30b of the turbine 34 of the turbine driven compressor 26, and the other exhaust valve 18a is dedicated to supplying the remaining expansion gases to the manifold 30a supplying exhaust gases to the turbine 36 driving the generator 38.

In the embodiment of FIG. 1, the system is configured for a hybrid vehicle power plant with the engine 12 having an output shaft 40 directly connected to a main generator 42. The main generator 42 generates electrical energy supplied to an integrator 44 that integrates energy input from the main generator 42 and the supplemental energy input from the turbine driven generator 38 and distributes the integrated input to the drive motor/generator 46 and the energy reserve, here a battery bank 48.

Figure 2:
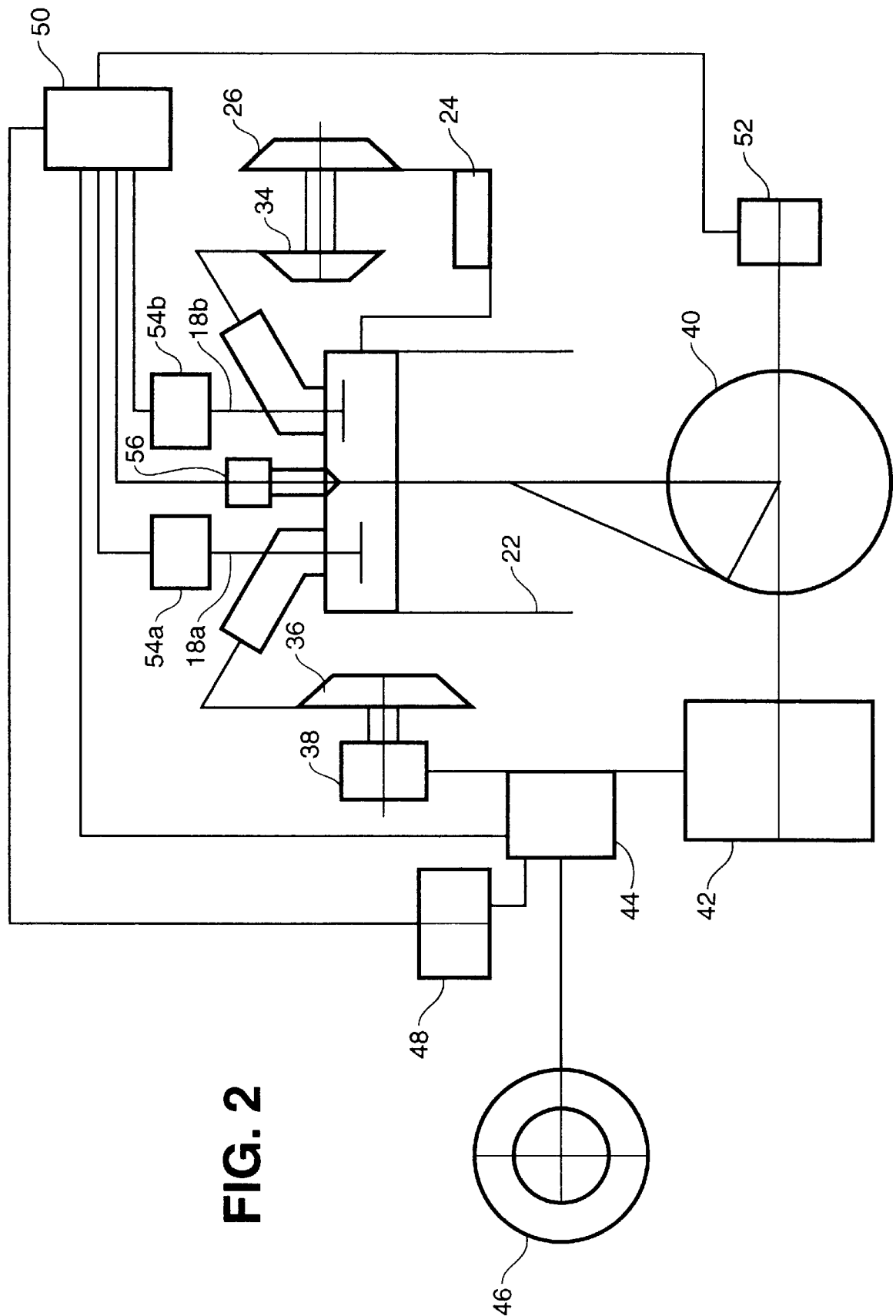
FIG. 2 is a schematic side view of the power plant system of FIG. 1.

System operation is controlled by an electronic control module 50 as shown in FIG. 2, which is connected to an encoder 52 at the output shaft 40 of the engine 12 to provide a reference cycle timing of engine operation for optimizing the timing and duration of valve operation.

Referring to the schematic illustration of FIG. 2, the two exhaust valves 18a and 18b are poppet valves that are independently controlled by electronically-operated solenoid actuators 54a and 54b which are electrically connected to and controlled by the electronic control module 50. The electronic control module also controls the fuel injector 56 for each cylinder. As schematically shown in FIG. 2, the exhaust valves 18a and 18b are independently controlled to produce an asymmetric exhaust stream with an optimized quantity passing through passage 28b to the turbine 34 driving the connected compressor 26 generating the required amount of compressed air for optimized combustion, and, the balance passing through passage 28a to the turbine 36 driving the generator 38.

It is to be understood that although a three-cylinder engine is shown by way of example, the engine may be any number of cylinders. A preferred embodiment comprises a one-cylinder, high-pressure, opposed-piston engine 60 shown in FIG. 3.

Figure 3:
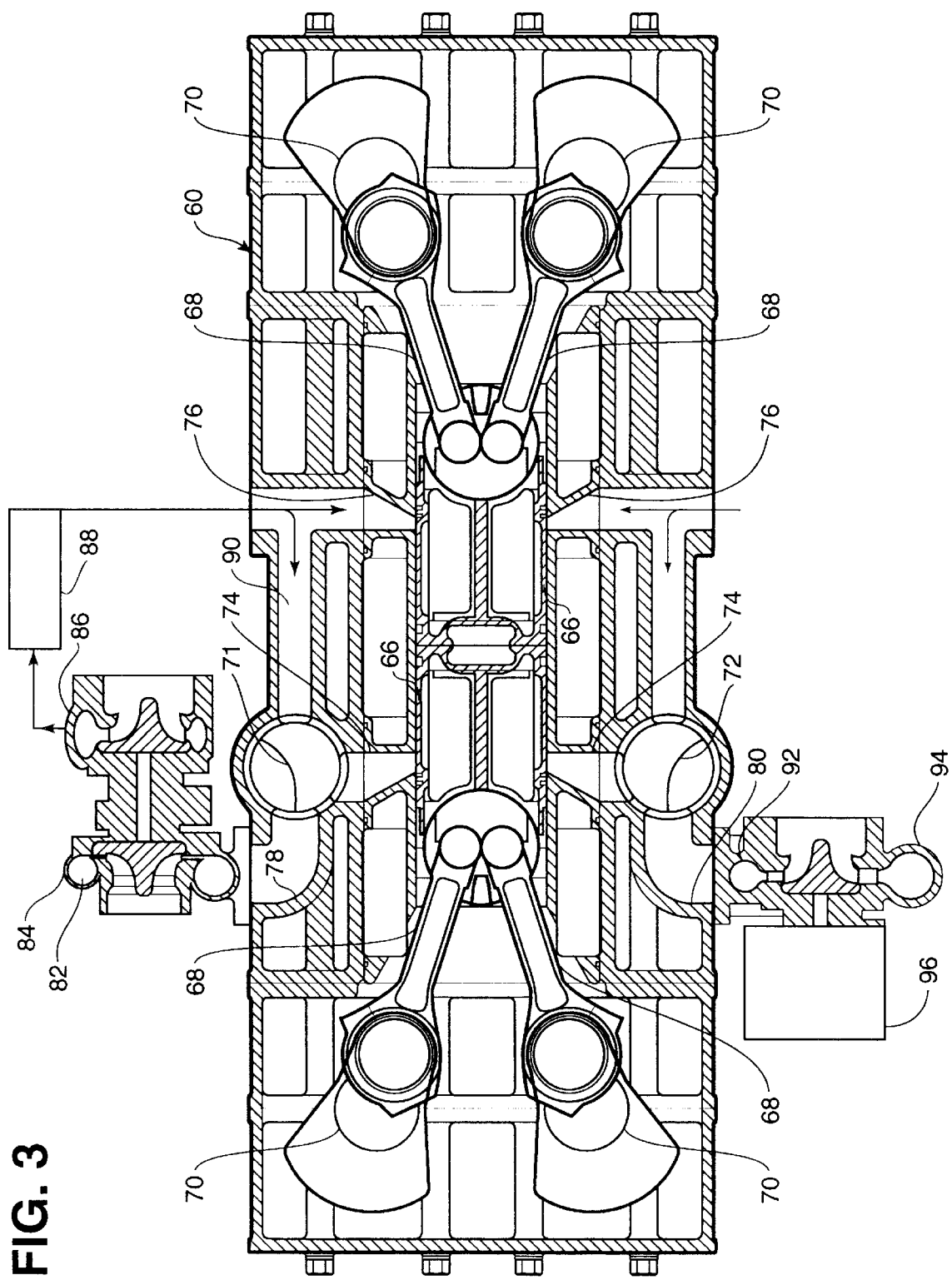
FIG. 3 is a cross sectional view of an alternate embodiment with an opposed piston engine.

Referring to FIG. 3, the opposed piston engine 60 has a housing 62 with a central cylinder 64 with opposed pistons 66, each having dual connecting rods 68 connected to dual crank shafts 70.

Rotary commutator valves 71 and 72 switch the first exposed ports 74a and 74b from exhaust to intake at the end of each expansion cycle in the two-cycle engine. When switched to intake, the ports combine with dedicated intake ports 76 for a common high volume intake for rapid air charging of the engine.

When switched to exhaust, the commutator valves 71 and 72 connect the exposed ports 74a and 74b to separate exhaust passages 78 and 80. Passage 78 leads exhaust gases to the intake 82 of a drive turbine 84 that is connected to a rotary compressor 86 that compresses air which is passed through an intercooler 88 to the air intake manifold 90 of the engine 60.

Separated passage 80 leads to the intake 92 of a turbine 94 that is connected to a generator 96 for production of electrical energy.

Each of the commutator valves 70 and 72 is independently operated by a separately controlled, rotary electronic actuator (not shown) in the same manner as the valves of the engine of FIGS. 1 and 2. In this manner, the desired exhaust for optimum operation of the compressor 86 is assured by controlling the timing of commutator valves 71 and 72, with the balance of the exhaust driving the generator 96 and recovering as electrical energy, the thermal energy otherwise lost by a "waste gate."

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A power plant comprising:
   a.) a positive displacement engine having a combustion chamber in which are generated expansion gases, an air intake system and an expansion gas exhaust system, the exhaust system having a first exhaust passage and a second exhaust passage, the engine having a first valve means between the combustion chamber and the first exhaust passage for regulating passage of expansion gases from the combustion chamber to the first exhaust passage and a second valve means between the combustion chamber and the second exhaust passage for regulating passage of expansion gases from the combustion chamber to the second exhaust passage;
   b.) a first turbine connected to the first exhaust passage;
   c.) a compressor mechanically connected to the first turbine, the compressor being connected to the air intake system of the engine;
   d.) a second turbine connected to the second exhaust passage;
   e.) an electrical generator mechanically connected to the second turbine; and,
   f.) valve control means for independently controlling the operation of the first valve means and the second valve means, and flow regulating means connected to the valve control means for adjustably regulating the allocation of expansion gases between the first and second passages, wherein the regulating means regulates the quantity of exhaust gases passing through the first exhaust passage for optimized compression of air by the compressor and for fuel efficient operation of the engine.

2. The power plant of claim 1 wherein the first and second valve means comprise electronically actuated valves electrically connected to the control means.

3. The power plant of claim 2 wherein the first and second valve means comprise first and second poppet valves.

4. The power plant of claim 2 wherein the first and second valve means comprise first and second commutator valves.

5. The power plant of claim 1 wherein the flow regulating means has sensor means for referencing the timing cycling of the engine for optimizing the timing and duration of the actuation of the first valve means and the second valve means.

6. The power plant of claim 1 wherein the engine has an output shaft and the power plant has a main generator connected to the output shaft of the engine.

7. The power plant of claim 6 wherein the power plant includes an electric drive motor and an integrator, wherein the generator connected to the turbine and the main generator connected to the output shaft of the engine are electrically connected to the integrator and the integrator is connected to the electric drive motor.

8. The power plant of claim 6 further including an electrical energy storage means for storing electrical energy generated by the generators wherein the integrator regulates distribution of generated electricity to the energy storage means and to the electric drive motor.

9. The power plant of claim 8 wherein the positive displacement engine comprises an opposed piston engine.

10. A power plant comprising:
- a.) a positive displacement engine comprising an opposed piston engine having a combustion chamber in which are generated expansion gases, an air intake system and an expansion gas exhaust system, the exhaust system having a first exhaust passage and a second exhaust passage, the engine having a first valve means for regulating passage of expansion gases from the combustion chamber to the first exhaust passage and a second valve means for regulating passage of expansion gases from the combustion chamber to the second exhaust passage;
- b.) a first turbine connected to the first exhaust passage;
- c.) a compressor mechanically connected to the first turbine, the compressor being connected to the air intake system of the engine;
- d.) a second turbine connected to the second exhaust passage;
- e.) an electrical generator mechanically connected to the second turbine;
- f.) control means for separately controlling the operation of the first valve means and the second valve means and regulating flow of expansion gases into the first and second passages, wherein compression of air by the compressor is optimized by the control means for fuel efficient operation of the engine, wherein the engine has an output shaft and the power plant has a main generator connected to the output shaft of the engine, and wherein the power plant includes an electric drive motor and an integrator, wherein the generator connected to the turbine and the main generator connected to the output shaft of the engine are electrically connected to the integrator and the integrator is connected to the electric drive motor; and,
- g.) an electrical energy storage means for storing electrical energy generated by the generators wherein the integrator regulates distribution of generated electricity to the energy storage means and to the electric drive motor.

* * * * *